Figure 1:
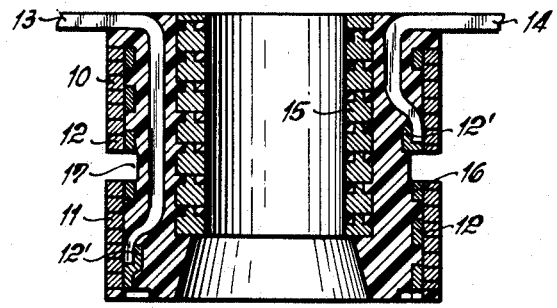

May 25, 1965     L. REISNECKER     3,185,878
SLIP-RING ASSEMBLY
Filed Dec. 19, 1962

INVENTOR
Ludwig Reisnecker
by
Michael S. Striker
Atty

United States Patent Office 3,185,878
Patented May 25, 1965

3,185,878
SLIP-RING ASSEMBLY
Ludwig Reisnecker, Rommelshausen, near Waiblingen, Germany, assignor to Robert Bosch G.m.b.H., Stuttgart, Germany
Filed Dec. 19, 1962, Ser. No. 245,849
Claims priority, application Germany, Dec. 22, 1961, B 65,337
10 Claims. (Cl. 310—232)

The present invention relates to slip-ring assemblies for use on electric motors or generators.

More particularly, the present invention relates to slip-ring assemblies which include at least a pair of slip rings and an electrically non-conductive body which is adapted to be fixed to the shaft of the motor or generator.

Such slip rings must be made of a material capable of slipping easily at its exterior surface with respect to brushes, or with respect to which brushes are capable of easily slipping, and in addition the slip rings must be connected to electrical conductors and must be securely anchored to the electrically non-conductive mass. Also, the slip rings must be made of a corrosion-resistant material.

Because the slip rings must fulfill the requirements of having a low coefficient of friction at their surfaces which are engaged by the brushes, because they must be made of a corrosion-resistant material, and because they must be securely fixed with the electrically non-conductive mass, conventional slip rings are expensive and thus the cost of slip-ring assemblies is undesirably high.

It is, therefore, a primary object of the present invention to provide a slip-ring assembly which will satisfy all of the above requirements and which at the same time will be far less expensive than conventional slip-ring assemblies.

A further object of the present invention is to greatly reduce the amount of material required for the slip rings themselves so that the cost of the entire assembly can be reduced.

An additional object of the present invention is to provide a slip-ring assembly which is capable of using as part of the assembly an inexpensive electrically conductive material without in any way detracting from the quality of the slip-ring assembly.

Also, it is an object of the invention to provide a process which enables the elements of the slip-ring assembly to be assembled and manufactured quickly, easily, and inexpensively.

With these objects in view the invention includes, in a slip-ring assembly, an electrically non-conductive body and an electrically conductive carrier securely anchored to this body and located at least in part at the exterior thereof. At least one electrical conductor is embedded in the non-conductive body and is fixed with the carrier so as to be electrically connected thereto, and a pair of slip rings surround and are fixed to the carrier so as to be connected therewith. Because of the use of such a carrier, which is interposed between the slip rings and the electrically non-conductive mass, it is possible to reduce the amount of material required for the slip rings themselves, and the carrier can be made of an inexpensive material since it does not have a sliding engagement with brushes or the like and since it does not have to be corrosion-resistant.

Figure 2:
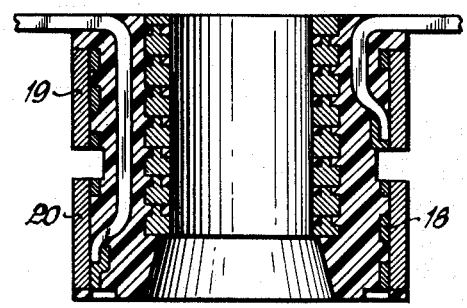

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows in an axial section one possible construction of a slip-ring assembly according to the invention; and FIG. 2 shows in an axial section another construction of a slip-ring assembly, the embodiment of FIG. 2 differing from that of FIG. 1 with respect to the structure of the slip rings themselves.

Referring now to FIG. 1, the slip-ring assembly illustrated therein includes a pair of slip rings 10 and 11. Each of these slip rings is made of chrome-steel wire of relatively small thickness and having a square cross section, in the illustrated example. The coils of wire which form the slip rings 10 and 11 surround a carrier 12 in the form of a sheet metal sleeve consisting of two insulated metal parts formed with a plurality of openings passing therethrough. Each of the slip rings is composed of a plurality of convolutions of chrome-steel wire, and all of the convolutions of each slip ring are solidly soldered to each other along their entire length, and furthermore the convolutions of each slip ring are soldered along their entire length to the apertured carrier sleeve 12. A pair of electrical conductors 13 and 14 are provided for the slip rings, respectively, and each of the conductors is formed with a substantially right-angle bend at its free end portion, and the free ends of the conductors 13 and 14 extend respectively into pockets 12′ pressed from the material of the apertured, sheet metal sleeve 12, and in these pockets the ends of the conductors 13 and 14 are also solidly soldered to the sleeve 12. Thus, the conductors 13 and 14, the sleeve 12, and the slip rings 10 and 11 are electrically connected to each other as a result of the soldering. Of course, the sleeve 12 has one portion connected electrically with the conductor 14 and with the slip ring 10, and another, separate portion connected electrically with the conductor 13 and the slip ring 11. As will be apparent from the description below, before the annular groove 17, shown in FIG. 1, is formed, the sleeve 12 can be one unitary member and also the slip rings can be in the form of a single continuous coil, and at this time the soldering of the convolutions of the wire to each other as well as to the sleeve 12 and the soldering of the conductors to the sleeve 12 in the pockets 12′ thereof can all take place in a single soldering operation, so that the soldering of the wire convolutions to each other and to the carrier as well as the soldering of the conductors to the carrier can take place in a rapid inexpensive manner.

After these electrically conductive elements (the slip rings, the carrier, and the conductors) are thus joined to each other, the assembly of electrically conductive elements is placed in a suitable mold in which there is also placed an inner metallic hub portion 15 in the form of an inner tubular sleeve formed also from a coil of wire whose convolutions engage each other along their entire length, and this hub portion 15 is positioned with respect to the conductors 13 and 14 in the manner shown in FIG. 1, where upon the electrically non-conductive plastic is introduced into the mold to form therein the plastic body 16 which is electrically non-conductive and which of course fills the space surrounding the coil 15 and surrounded by the sleeve 12, the plastic material entering into the apertures of the sleeve 12 so that the latter becomes securely anchored to the body 16 when the plastic material sets. Of course, it is possible to provide, initially, a pair of separate slip rings to be introduced into the mold, but it is preferred to provide, as pointed out above, a continuous coil from which the slip rings 10 and 11 are subsequently formed as well as a continuous sleeve 12 which is subsequently formed into a pair of sleeve portions, because it is much easier to handle a single coil of wire and a one-piece sleeve as well as to position such a structure accurately within the mold. Thus, according to the process of the invention after the plastic mass 16 has solidified, the entire assembly is removed from the mold and then mounted on a lathe or other appropriate machine tool which will form the groove 17, the cutter of such a machine tool or the like cutting through an intermediate portion of the wire coil as well as through the sleeve at least up to the plastic body 16 so that in this way it is possible to quickly and inexpensively separate the single coil into the pair of slip rings 10 and 11 as well as into the pair of sleeve portions which are respectively soldered thereto and to the conductors 14 and 13, as indicated in FIG. 1. The groove 17 is of course situated between the axially displaced portions of the sleeve 12 to which the ends of the wires 13 and 14 are fixed, so that in this way one of these wires or conductors will be electrically connected with one of the slip rings, while the other conductor will be electrically connected with the other slip ring.

The construction of FIG. 2 differs from that of FIG. 1 only in that the slip rings 19 and 20 which are also solidly soldered to the apertured sheet metal sleeve 18 are in this case each in the form of a section of a tube or a section of a cylinder formed by deep-drawing of sheet metal, or, if desired, the slip rings may simply be formed by circularly rolling a meal band until it has a tubular configuration. The remaining elements of FIG. 2 are identical with those of FIG. 1, and the process of manufacture is also identical since a single tube may be worked upon with a suitable cutting tool so as to form the groove 17 which provides the separate slip rings 19 and 20 as well as the separate sleeve portions.

The sheet metal sleeve 12 or 18 can simply by formed from rolling or curving an apertured sheet metal member so that it will have a tubular configuration. The thickness of the wire used to form the slip rings 10 and 11 or the thickness of the wall of the tube sections 19 and 20 approximately equals the thickness of the carrier 12 or the carrier 18.

With the construction of the invention according to which a sheet metal carrier of inexpensive material is used, the amount of corrosion-resistant slip ring material can be kept exceedingly small, and in addition with the structure of the invention the anchoring of the electrical conductors in the plastic mass and the electrical connection of these conductors to the slip rings is greatly simplified. The material of the slip rings while being corrosion-resistant also should have a low coefficient of friction with respect to the brushes at the exterior surfaces of the slip rings, and as was pointed out above, chrome-steel is preferably used for the slip rings of the invention, and even though such a material is quite expensive nevertheless so little of it is required as a result of the presence of the carrier sleeve 12 or 18 that the cost of the entire assembly is not rendered undesirably high.

It will be understood that each of the elements described above, or two or more together, may also find a useful application in other types of slip-ring assemblies differing from the types described above.

While the invention has been illustrated and described as embodied in slip ring assemblies and process for manufacturing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A slip-ring assembly comprising, in combination, a body of electrically non-conductive material; an electrically conductive carrier anchored to said body and located at least in part at the exterior thereof; at least one electrical conductor embedded in said body and joined to said carrier so as to be electrically connected therewith; and a pair of slip rings fixed to the exterior of said carrier so as to be electrically connected thereto and carried thereby, said slip rings being made of corrosion-resistant material and said slip rings being soldered to said carrier and each being in the form of a coil of wire of square cross section whose convolutions are solidly soldered to each other along their entire length.

2. A slip-ring assembly comprising, in combination, a body of electrically non-conductive material; an electrically conductive carrier anchored to said body and located at least in part at the exterior thereof; at least one electrical conductor embedded in said body and joined to said carrier so as to be electrically connected therewith; and a pair of slip rings fixed to the exterior of said carrier so as to be electrically connected thereto and carried thereby, said slip rings being made of corrosion-resistant material, said carrier being in the form of a tubular body and said slip rings having a thickness approximately equal to that of said carrier.

3. A slip-ring assembly comprising, in combination, an electrically non-conductive body; an electrically conductive tubular sleeve carried by said body at the exterior thereof, said sleeve being formed with openings into which portions of said body respectively extend for anchoring said sleeve to said body; at least one electrical conductor embedded in said body and fixed to said sleeve so as to be electrically connected thereto; and a pair of slip rings surrounding and fixed to said sleeve so as to be electrically connected therewith, said slip rings being made of corrosion-resistant material and having exposed, outer running surfaces.

4. In an assembly as recited in claim 3, said sleeve being in the form of rolled sheet metal.

5. In an assembly as recited in claim 3, said sleeve being formed with a pocket which receives an end of said electrical conductor and in which said end of said electrical conductor is fixed with said sleeve.

6. A slip-ring assembly comprising, in combination, a tubular plastic, electrically non-conductive body; an electrically conductive sleeve anchored to said body and located at least in part at the exterior thereof, said sleeve having a pair of portions which are axially spaced from each other; a pair of electrical conductors each embedded in said plastic body and having a right-angle bend, said conductors respectively having free ends fixed to said sleeve portions so as to be electrically connected therewith; and a pair of slip rings fixed to and respectively surrounding said sleeve portions.

7. A slip-ring assembly comprising, in combination, a tubular plastic, electrically non-conductive body; an electrically conductive sleeve anchored to said body and located at least in part at the exterior thereof, said sleeve having a pair of portions which are axially spaced from each other; a pair of electrical conductors each embedded in said plastic body and having a right-angle bend, said conductors respectively having free ends fixed to said sleeve portions so as to be electrically connected therewith; a pair of slip rings fixed to and respectively surrounding said sleeve portions; and an inner tube anchored to said tubular plastic body adjacent to the inner surface thereof and being at least partly exposed at said inner surface of said plastic body.

8. A slip-ring assembly comprising, in combination, a tubular plastic, electrically non-conductive body; an electrically conductive sleeve anchored to said body and located at least in part at the exterior thereof, said sleeve having a pair of portions which are axially spaced from each other; a pair of electrical conductors each embedded in said plastic body and having a right-angle bend, said conductors respectively having free ends fixed to said sleeve portions so as to be electrically connected therewith; a pair of slip rings fixed to and respectively surrounding said sleeve portions; and an inner tube anchored to said tubular plastic body adjacent to the inner surface thereof and being at least partly exposed at said inner surface of said plastic body, said inner tube being in the form of a coil of wire whose convolutions engage each other along their entire length.

9. An assembly as recited in claim 3, and wherein said slip rings are made of chrome-steel.

10. An assembly as recited in claim 2, and wherein said slip rings are made of chrome-steel.

References Cited by the Examiner
UNITED STATES PATENTS

| 1,243,286 | 10/17 | Gscheidlen | 310—232 |
| 2,844,749 | 7/58 | Shetterly | 310—234 |
| 2,878,405 | 3/59 | Merril | 310—234 |

FOREIGN PATENTS

| 314,724 | 10/19 | Germany. |
| 903,944 | 2/54 | Germany. |

MILTON O. HIRSHFIELD, *Primary Examiner.*